(12) United States Patent
Washiro

(10) Patent No.: US 7,853,208 B2
(45) Date of Patent: Dec. 14, 2010

(54) COMMUNICATION SYSTEM AND COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 11/942,998

(22) Filed: Nov. 20, 2007

(65) Prior Publication Data

US 2008/0119135 A1    May 22, 2008

(30) Foreign Application Priority Data

Nov. 21, 2006  (JP) ............................ P2006-314459

(51) Int. Cl.
*H04B 5/00* (2006.01)
(52) U.S. Cl. ................... 455/41.1; 455/80; 455/129; 455/319; 343/743; 343/814; 340/572.7
(58) Field of Classification Search ............ 455/80, 455/129, 319, 280, 338, 41.1; 343/743, 814, 343/816, 820, 857; 340/572.7
See application file for complete search history.

(56) References Cited

U.S. PATENT DOCUMENTS

| | | | |
|---|---|---|---|
| 2,685,068 A | 7/1954 | Goubau | |
| 2,921,277 A | 1/1960 | Goubau | |
| 4,942,377 A * | 7/1990 | Ishikawa et al. | 333/202 |
| 5,434,579 A * | 7/1995 | Kagoshima et al. | 343/700 MS |
| 5,555,337 A | 9/1996 | Hata | |
| 6,218,914 B1 | 4/2001 | Kubota et al. | 333/202 |
| 6,323,811 B1 * | 11/2001 | Tsubaki et al. | 343/700 MS |
| 6,356,244 B1 * | 3/2002 | Mizuno et al. | 343/895 |
| 6,492,946 B2 * | 12/2002 | Nagumo et al. | 343/700 MS |
| 6,784,843 B2 * | 8/2004 | Onaka et al. | 343/700 MS |
| 7,158,033 B2 * | 1/2007 | Forster | 340/572.1 |
| 7,750,851 B2 * | 7/2010 | Washiro | 343/700 MS |
| 2003/0045324 A1 * | 3/2003 | Nagumo et al. | 455/550 |
| 2004/0252729 A1 | 12/2004 | Shinoda et al. | |
| 2007/0205949 A1 * | 9/2007 | Enoshima et al. | 343/702 |
| 2008/0064331 A1 * | 3/2008 | Washiro | 455/41.1 |
| 2008/0076351 A1 * | 3/2008 | Washiro | 455/41.1 |
| 2008/0117117 A1 * | 5/2008 | Washiro | 343/850 |

(Continued)

FOREIGN PATENT DOCUMENTS

JP    7-175987    7/1995

(Continued)

*Primary Examiner*—Minh D Dao
(74) *Attorney, Agent, or Firm*—Finnegan, Henderson, Farabow, Garrett & Dunner, L.L.P.

(57) ABSTRACT

A communication system, including a transmitter having a transmitting circuit unit to generate a data transmission-adaptive RF signal and an electric-field-coupling antenna to send out the RF signal as an induction field and/or an electrostatic field, a receiver having a electric-field-coupling antenna and a receiving circuit unit to receive and process the RF signal received by the electric-field-coupling antenna, and a coupling apparatus having a plurality of transmitter-side electric-field-coupling antennas to receive the RF signal which is in capacitive coupling with the transmitter-side electric-field-coupling antenna and outputted from the electric-field-coupling antenna, a signal line to transmit the received RF signal, and a plurality of receiver-side electric-field-coupling antennas to output the RF signal which is in capacitive coupling with said the receiver-side electric-field-coupling antenna and transmitted through the signal line.

19 Claims, 10 Drawing Sheets

U.S. PATENT DOCUMENTS

| | | | |
|---|---|---|---|
| 2008/0125036 A1* | 5/2008 | Konya et al. | 455/41.1 |
| 2008/0311849 A1* | 12/2008 | Washiro | 455/41.1 |
| 2009/0021352 A1* | 1/2009 | Kataya et al. | 340/10.1 |
| 2009/0091456 A1* | 4/2009 | Takei | 340/572.7 |
| 2009/0121949 A1* | 5/2009 | Washiro | 343/702 |
| 2009/0201157 A1* | 8/2009 | Forster | 340/572.7 |
| 2010/0056046 A1* | 3/2010 | Tomoda | 455/41.1 |
| 2010/0060544 A1* | 3/2010 | Penev et al. | 343/876 |

FOREIGN PATENT DOCUMENTS

| | | |
|---|---|---|
| JP | 09-018393 | 1/1997 |
| JP | 2003-115707 | 4/2003 |
| JP | 2003-188882 | 7/2003 |
| JP | 2004-214879 | 7/2004 |
| JP | 2004-242220 | 8/2004 |
| JP | 2005-18671 | 1/2005 |
| JP | 2006-19979 | 1/2006 |
| JP | 2006-60283 | 3/2006 |
| JP | 2006-94429 | 4/2006 |
| JP | 2006-106612 | 4/2006 |

* cited by examiner

COAXIAL CABLE

FLEXIBLE MULTI-LAYERED SUBSTRATE

COMMUNICATION SYSTEM AND COMMUNICATION APPARATUS

BACKGROUND OF THE INVENTION

1. Field of the Invention

The present invention relates to a communication system, as well as to a communication apparatus, which is adapted to perform large capacity data communication among information apparatuses, and particularly, relates to a communication system, as well as to a communication apparatus, which is adapted to perform data communication among information apparatuses by use of an electrostatic field without causing interference with other communication systems.

More specifically, an embodiment of the present invention relates to a communication system, as well as to a communication apparatus for transmitting radio frequency (herein after referred to as RF) communication signal between information apparatuses each of which is spaced apart in an ultra-close range, by use of an electrostatic field and/or an induction field, and more particularly, to a communication system, as well as to a communication apparatus, which allows large capacity transmission by use of an electrostatic field and/or an induction field with each apparatus arranged in an ultra-close range, by efficiently transmitting RF signals between an electric-field-coupling antenna (herein after referred to as EFC antenna) mounted to the respective information apparatuses.

2. Description of Related Arts

As methods of cable-less data transmission between small apparatuses, radio communication systems adapted to transmit/receive radio signals by use of an antenna have been developed, inclusive of Bluetooth communications and wireless LANs (Local Area Networks) representative of IEEE802.11. However, since radio communication by use of the antenna emits radio waves from a transmitting side, regardless of whether there exist the other party for making communication or not, a problem exists in that a source of radio disturbance against communication systems which are arranged in close range each other is caused. Further, the antenna also receives radio waves inclusive of those transmitted from a distant place, and hence, is easily affected by disturbing radio waves around, whereby reception sensitivity is degraded. In the presence of a plurality of other party for making communication, complicated setting is required to select desired one from a plurality of other parties. For the radio communication made by a plurality of pair of radio equipment within a limited range, frequency should be selected before the communication is made in order to avoid mutual interference. Further, a change of polarized wave direction to an orthogonal direction results in a failure of the radio waves communication.

On the other hand, communication systems using an induction field, an electrostatic field and the like may be employed in the radio communication, in addition to radio communication by use of a radiant electromagnetic field. The radio communication by use of the radiant electromagnetic field encounters a difficulty in realizing high-speed large-capacity feeble radio communication, because the electric field strength is inversely proportional to a distance and attenuation of the electric field strength due to the distance is relatively small. In contrast to the above, the induction field and the electrostatic field provide the electric field strength inversely proportional to the square and the cube of the distance respectively, thereby enabling the feeble radio communication such that the electric field strength (the intensity of radio waves) at a position three meters away from the radio equipment becomes a predetermined level or below, while maintaining the electric field strength for performing stabled radio communication with respect to the ultra-close range. Therefore, a radio station license is not required. Hence, non-contact ultra-close range communication by means of capacitive coupling using the induction field or the electrostatic field may be suited for realization of the feeble radio communication.

For instance, according to the communication system based on the capacitive coupling, other communication systems are not interfered, because no coupling relation is created and the radio wave is not emitted in the absence of the other party for making communication in a close range. Further, even if the radio wave is transmitted from a distant place, an EFC antenna makes no radio wave reception unless any capacitive coupling effect arises. Thus interference by the other communication systems may be prevented. More further, in the related art radio communication using the antenna, while the electric field strength of the radiant electromagnetic field is inversely proportional to the distance, in the induction electromagnetic field, the electric field strength is attenuated by the amounts inversely proportional to the square of the distance, and in the electrostatic field, the electric field strength is attenuated by the amounts inversely proportional to the cube of the distance. For this reason, according to the communication system based on the capacitive coupling, it is possible to provide the feeble radio communication assumed to be a level approximately equivalent to noise for other radio systems exists in a close range without requiring the radio station license.

Data communication technologies using the induction field and/or the electrostatic field have been widely used in radio frequency identifications (RFIDs) or the like. For instance, a proposal is made on a RFID tag system which enable secure reading/writing of information even though the RFID tags are overlapped. The above system is enabled by forming an auxiliary communication structure unit provided such that RFID tags are located between a plurality of auxiliary communication structure, and by arranging the RFID tags attached to a plurality of products such that they are sandwiched between the auxiliary communication structures (See Japanese Patent Application Publication No. JP2006-60283, Patent document 1, for instance).

There has been also a proposal on a data communication apparatus by use of an induction field, specifically, a data communication apparatus having, in addition to an apparatus body and attaching means to attach the apparatus body to a user's body, an antenna coil and data communication means adapted to perform data communication in a non-contact manner with an external communication apparatus with the antenna coil inbetween, in which the antenna coil and the data communication means are arranged in an outer case provided at an upper part of the apparatus body (See Japanese Patent Application Publication No. JP 2004-214879, Patent document 2, for instance).

There is further a proposal on a mobile telephone having a RFID which ensures a certain communication distance without degrading characteristics of mobile telephones by taking a structure in which an antenna coil adapted to perform data communication with an external apparatus is mounted to a memory card to be inserted into a mobile information apparatus and a RFID antenna coil is placed at the outside of a memory card insertion slot of a mobile information apparatus (See Japanese Patent Application Publication No. JP 2005-18671, Patent document 3, for instance).

The related art communication based on the capacitive coupling is unsuitable for transmission of a large capacity of data because low frequency signals are used. However, large capacity transmission may be attainable by transmitting RF signals by use of the capacitive coupling. Specifically, applications of high-frequency wide-band communication system, such as UWB communication to the capacitive coupling make it possible to realize large capacity data communication with the feeble radio communication.

The UWB (Ultra Wide Band) communication specified herein is adaptable to realize, by using extremely wide range of frequency bands, 3.1 to 10.6 GHz, large capacity radio data transmission, approximately 100 Mbps, for the close range (specifically, large capacity data, such as moving images and music data equivalent to data contained in a sheet of CD, for instance may be transferred quickly in a short time). Further, progress is extensively made in developing a transmission system by use of UWB low bands in the range of 3.1 to 4.9 GHz, in considerations of not only transmission practicability of data exceeding 100 Mbps without requiring the transmission band as wide as 3.1 to 10.6 GHz, but also easy fabrication of RF circuits.

The UWB communication, although originally being communication technology developed as the radio communication system using the antenna, in an embodiment of the present invention, it realizes high-speed data transmission by use of a feeble electric field with respect to a close range area. According to the UWB communication system by use of the electrostatic field, the high-speed data transmission by use of the feeble electric field with respect to the close range area may be realized, resulting in contributions to one of effective radio communication technologies loaded in mobile apparatuses, such as ultra high-speed close-range DANs (Device Area Networks) including storage devices, for instance.

When effecting not the radio communication but the UWB communication based on the capacitive coupling, the electric field strength is inversely proportional to the cube of the distance. For this reason, an attempt to control the electric field strength (the intensity of radio waves) at a position three meters away from the radio equipment at a predetermined level or below may provide the feeble radio communication requiring no radio station license to allow a communication system to be constructed at low cost. Further, for the data communication covering in the ultra-close range by use of the capacitive coupling, there are advantages in that signal quality is not degraded due to reflective objects around, and there is no necessity to give consideration to hacking prevention and/or privacy security on a transmission line.

FIG. 16 shows one configuration of a communication system composed of a transmitter and a receiver each of which is equipped with a RF EFC antenna. Referring to FIG. 16, a transmitter and a receiver are formed by connection of planar electrodes 14 and 24, serial inductors and parallel inductors to a RF signal transmission line. The RF signal transmission line specified herein includes coaxial cables, micro-strip transmission lines and coplanar waveguides etc.

The transmitting and receiving electrodes 14 and 24 respectively included in the transmitter 10 and the receiver 20 are placed face-to-face with around three centimeters distance kept, for instance, thereby allowing the capacitive coupling. When a host application sends a transmit request, a transmitter-side transmitting circuit unit 11 generates a RF transmitter signal, such as UWB signals based on transmission data, followed by propagation of the signal from the transmitting electrode 14 to the receiving electrode 24. Then, a receiver 20—side receiving circuit unit 21 performs modulating and decoding to the received RF signal, followed by transfer of reconfigured data to the host application.

As shown in FIG. 16, when EFC antennas included in the transmitter and the receiver are respectively faced each other, two electrodes act as a single capacitor and, on the whole, operate like a band-pass filter, thereby allowing the RF signals to be transmitted efficiently between the two EFC antennas.

Hereupon, in the communication by use of high frequencies covering GHz-bands, like the UWB communication, reflection of the signal causes a propagation loss when there is mismatch of impedance at a coupling part, leading to a reduction in efficiency. For preferable formation of a transmission line based on the capacitive coupling, sufficient impedance matching needs to be taken between the EFC antennas respectively included in the transmitter and the receiver.

Further, the communication system by use of the capacitive coupling also involves a problem of large attenuation depending on the distance. For the reason that the propagation loss is caused depending on propagation distance range in relation to a wavelength, the problem of the propagation loss depending on electrode-to-electrode spacing becomes serious during propagation of the RF signal by use of the capacitive coupling. Accordingly, the need exists to bring the coupling electrodes (the EFC antennas) of the transmitter and the receiver closer to each other as much as possible, causing a failure to communicate for far distance, resulting in a lack of user's convenience.

Subtle alignment of positions is required between the coupling electrodes to bring the coupling electrodes having the capacitive coupling sufficiently closer to each other, and during data communication, the positions need to be kept. There are many details difficult for the user to understand in that at which positions the electrodes should be provided in communication apparatuses, which electrode portion is required to be contacted, or how angle of faced electrode portions should be determined to obtain an optimum communication situation. Accordingly, there is a fear of failing to attain the maximum communication speed.

SUMMARY OF THE INVENTION

According to an embodiment of the present invention, it is desirable to provide a superior communication system, as well as a superior communication apparatus, which allows large capacity data communication between information apparatuses by employing a UWB communication system using wide band signals of high frequency.

According to an embodiment of the present invention, it is further desirable to provide a superior communication system, as well as a superior communication apparatus, which realizes efficient transmission of RF signals between EFC antennas respectively included in information apparatuses spaced apart in an ultra-close range, thereby enabling large capacity transmission by use of an induction field and/or an electrostatic field.

It is further desirable to provide a superior communication system, as well as a superior communication apparatus, which allows efficient data transmission by keeping proper electrode-to-electrode spacing, while allowing easy alignment between transmitter and receiver electrodes having capacitive coupling.

An embodiment of the present invention relates to a communication system, which includes a transmitter having a transmitting circuit unit for generating a data transmission-adaptive RF signal, and a EFC antenna for sending out the above RF signal as an induction field and/or an electrostatic field, and a receiver having a receiving circuit unit for processing the RF signal received by the EFC antenna. The communication system further includes a plurality of RF coupling apparatuses at transmitter-side for receiving RF signals which are in capacitive coupling with the EFC antenna included in the transmitter and outputted from the EFC antenna, a signal line for transmitting the received RF signal, and a coupling apparatus having a plurality of receiver-side EFC antenna for outputting RF signals which are in capacitive coupling with the EFC antenna included in the receiver and transmitted through the above signal line.

However, the "system" specified herein is referred to a logical aggregate of a plurality of apparatus (or functional modules adapted to implement specific functions), and it does not matter whether each apparatus or functional module is contained in a single casing or not (the same is true for the following description).

The communication system according to an embodiment of the present invention is configured to transmit a UWB signal by giving the capacitive coupling between the transmitter and the receiver by using the EFC antennas respectively included in the transmitter for generating the data transmission-adaptive RF signal such as the UWB signal and the receiver receiving and processing the UWB signal. The induction field and/or the electrostatic field attenuate by amounts which are inversely proportional to the cube of a distance, resulting in advantages of eliminating the need to give consideration to hacking prevention and/or privacy security on the transmission line, while providing the feeble radio communication requiring no radio station license. Further, because of application of the UWB communication, the large capacity communication covering the ultra-close range is possible, and permits large capacity data such as moving images and music data equivalent to data contained in a sheet of CD to be transferred at high speed in a short period of time.

For the radio communication system by use of the antenna representative of a wireless LAN, it is difficult to realize large-capacity ultra-close range feeble radio communication by use of a RF wide-band signal, giving rise to a problem of interference with other communication systems. On the other hand, the communication system by use of an induction field and/or the electrostatic field creates no coupling relation between the EFC antennas in the absence of the other party for making communication at the close range. Specifically, since no radiation of the radio waves arises from the unused EFC antennas, other communication systems are not interfered. Even if the radio waves are transmitted from a distant place, the EFC antenna makes no radio wave reception, resulting in exemption of interference by the other communication systems. While the communication by use of the capacitive coupling has been unsuitable for transmission of a large quantity of data because of the use of the low frequency signals, the present inventors are of the opinion that large capacity transmission is attainable by transmitting the RF signals by use of the capacitive coupling.

A RF circuit causes a propagation loss depending on a propagation distance in relation to a wavelength, and as a result, the propagation loss needs to be suppressed sufficiently low when the RF signal such as the UWB signal is transmitted. On the other hand, the communication system according to an embodiment of the present invention allows a propagation loss reduction to be attained by suppressing the reflected waves caused between the EFC antennas under such cooperative actions of the EFC antennas in the transmitter and the receiver such that impedance at their coupling portions are matched.

The communication system by use of the capacitive coupling involves a problem of large attenuation depending on the distance. For the reason that the propagation loss arises depending on the propagation range in relation to the wavelength, the problem of the propagation loss depending on the electrode-to-electrode spacing becomes serious during propagation of the RF signal by use of the capacitive coupling. For this reason, it is necessary to make subtle alignment of the coupling electrodes of the transmitter and the receiver by closely arranging them. There are many details difficult for the user to understand in that at which portion of the apparatus each electrode should be placed, which electrode portion is required for contacting, or how angle of faced electrode portions should be determined to obtain the optimum communication situation. Accordingly, there is a fear of failing to attain the maximum communication speed.

Thus, the communication system according to an embodiment of the present invention makes use of the coupling apparatus formed by arrangement of a plurality of EFC antenna in array. Specifically, the coupling apparatus has a lattice-like arranged signal line made up of lines such as micro-strip transmission lines, coplanar waveguides and coaxial cables, and at each intersection point of the signal line, the EFC antenna is placed.

For the radio communication, placement of a plurality of transmitting antenna in parallel causes transmitting power to be distributed to each antenna, and hence, brings about a reduction in individual antenna output, thus antennas making no contribution to communication wastes the transmitting power uselessly. On the other hand, with respect to the communication system based on the capacitive coupling, only the EFC antenna having the coupling relation with the other EFC antenna is adapted to transmit the RF signal, causing the EFC antennas other than the above to act as open-ended. Specifically, even if a plurality of EFC antennas are arranged in array, only the EFC antenna having the capacitive coupling with the other party for making communication operates as a load, and the problem of the transmitting power waste by the EFC antenna having no capacitive coupling with the EFC antenna at the side of the other party of communication does not exist.

The coupling apparatus formed by placement of a plurality of EFC antenna in array may be used as the EFC antenna for the single radio equipment, or alternatively, may be used as a coupling apparatus or a "communication sheet" interposed between two or more communication-adaptive radio equipment. In the latter case, propagation of the RF signal received at the EFC antenna having the capacitive coupling with the EFC antenna of one radio equipment is made along signal lines, and followed by emission of the RF signal from the EFC antenna having the capacitive coupling with the EFC antenna of the other radio equipment. Accordingly, the communication sheet is assumed to be equivalent to a circuit including only the EFC antennas having the coupling relation, with the EFC antennas other than the above cleared off.

Only when the coupling electrode of the communication sheet and the coupling electrode of the external radio equipment are spaced in the close range each other, the RF signal is supplied, permitting the power to be transmitted between the faced coupling electrodes. Conversely speaking, when the external coupling electrode is located at a distant place, the signal and/or the power within the communication sheet is prevented from going out of the sheet, resulting in prevention of affecting the external apparatus and information leakage caused by radiation of unnecessary electromagnetic waves.

There is no radiation from the coupling electrodes which are not relevant to communication, among the coupling electrodes on the communication sheet, enabling efficient transmission of the signal and/or the power only to the required coupling electrodes. Specifically, it is possible to transmit the signal having the same power level as that obtained when one-to-one connection at the transmission line is made at an arbitrary position on the communication sheet, even though a communication sheet power is not applied from the outside.

Hereupon, when the spacing between the intersection points of the signal line is set to positive integral multiples of the wavelength, the EFC antenna having the capacitive coupling with the other party for making communication allows the signals inclusive of those having been transmitted through any route within the communication sheet to be observed in the same phase condition, causing the signals to be intensified by each other to ensure efficient communication. Conversely, when the spacing between the intersection points of the signal line is not set to positive integral multiples of the wavelength, phases of the signals transmitted through the different routes to the EFC antenna having the capacitive coupling with the other party for making communication are not matched, thereby causing the signals to be enfeebled by each other due to interference.

No matter which routes the signals have passed within the communication sheet, if the signals in the same phase condition are inputted into the coupling electrode, results in prevention of the signal level from being intensified or enfeebled by each other under the action of interference between the RF signals propagated through the different routes within the communication sheet, thereby enabling stabled communication.

When the available frequency band is assumed to be the UWB low band (previously described) in the range of 3.1 to 4.9 GHz, the wavelength of about 75 mm is obtained. Thus, placement of the EFC antenna at each intersection point of the signal line taking a linear form fails to provide a higher density of the EFC antennas on the communication sheet. If this is the case, a lack of uniformity in a communication quality occurs on the communication sheet, or a need arises to make, on the communication sheet, alignment of the radio equipment-side EFC antennas. Thereupon, it is also allowable to bend the signal lines connecting intersection points such that the spacing between the EFC antennas is narrowed.

The communication sheet may be implemented, for instance, in the form a printed substrate. For instance, after the signal line made up of the micro-strip transmission line is laid on the printed substrate, a EFC antenna component may be mounted at each intersection point of the signal line.

Alternatively, it is also allowable to implement the communication sheet in the form of a multi-layered substrate, inclusive of up to the EFC antennas. The multi-layered substrate of this type takes a multi-layered structure obtained by lamination of, respectively through dielectric layers, a first conductor layer serving as the coupling electrode, a second conductor layer formed by connection of an impedance matching unit and/or a resonance unit made up of a lumped constant circuit or a distributed constant circuit to each intersection point, while the signal line made up of the micro-strip transmission line is laid, and a third conductor layer serving as a ground. In the conductor layer included in the signal line, a parallel inductor serving as the lumped constant circuit or a stub serving as the distributed constant circuit is connected at each intersection points of signal lines. The impedance matching unit is connected to each of the coupling electrode and the ground via through holes passing through the dielectric layers arranged as upper and lower layers.

Alternatively, it is also allowable to connect a coaxial cable to the intersection point of the signal line included in an inner layer of the multi-layered substrate of this type to perform input/output of the RF signal by cable without employing the EFC antennas.

Alternatively, by use of flexible materials as the multi-layered substrate, it is adaptable to fabricate a communication sheet successful in giving a two-dimensional communication function to something like a tablecloth.

Placement of the EFC antenna-mounted radio equipment in an arbitrary location on the communication sheet of this type may facilitate more privacy-securable communication efficiently through the communication sheet without having any effect on the external apparatus. It is also possible to transmit, in a non-contact manner, the power to the electric apparatus placed in an arbitrary location on the communication sheet by taking out the power after rectification of the RF signal having been received by the EFC antenna.

According to an embodiment of the present invention, there is provided the superior communication system, as well as the superior communication apparatus, which is adaptable to the large capacity data communication between the information apparatuses according to the UWB communication system using the wide band signals of RF.

According to an embodiment of the present invention, there is provided the superior communication system, as well as the superior communication apparatus, which realizes the efficient transmission of the RF signals between the EFC antennas respectively included in the information apparatuses arranged in the ultra-close range, thereby enabling the large capacity transmission by use of the induction field and/or the electrostatic field.

According to an embodiment of the present invention, there is provided the superior communication system, as well as the superior communication apparatus, which is adaptable to the efficient data transmission with the proper electrode-to-electrode spacing kept, while facilitating the easy alignment between the transmitter and receiver electrodes having the capacitive coupling.

DETAILED DESCRIPTION OF EMBODIMENTS

Embodiments of the present invention are hereinafter described with reference to the accompanying drawings.

An embodiment of the present invention relates to a communication system adapted to perform data transmission between information apparatuses by use of an induction field and/or an electrostatic field. According to a communication system based on capacitive coupling, no coupling relation is created in the absence of the other party for making communication in a close range and radio waves are not radiated, causing no interference with other communication systems. Even if the radio waves are transmitted from a distant place, an EFC antenna makes no radio wave reception, resulting in exemption from interference by the other communication systems.

In the related art radio communication by use of an antenna, the field strength of a radiant electromagnetic field attenuates by amounts which are inversely proportional to a distance. In contrast to the above, an induction field causes the field strength to be attenuated by amounts which are inversely proportional to the square of the distance, while an induction field and/or an electrostatic field causes the field strength to be attenuated by amounts which are inversely proportional to the cube of the distance. Thus, according to the communication system based on the capacitive coupling, it is possible to provide feeble radio communication assumed to be on a level equivalent to noise level for other radio systems situated in the neighborhood, thus a radio station license is not required.

The related art communication based on the capacitive coupling is unsuitable for transmission of a large quantity of data because low frequency signals are used. However, it may be supposed that large capacity transmission is attainable by transmitting RF signals by use of the capacitive coupling. Specifically, applications of high-frequency wide-band communication system like UWB communication to the capacitive coupling make it possible to realize large capacity data communication as well as the feeble radio communication. A UWB communication system using the induction field and/or the electrostatic field is adaptable to transfer large capacity data such as moving images and music data equivalent to data contained in a sheet of CD, for instance, at high speed in a short period of time.

Figure 16:
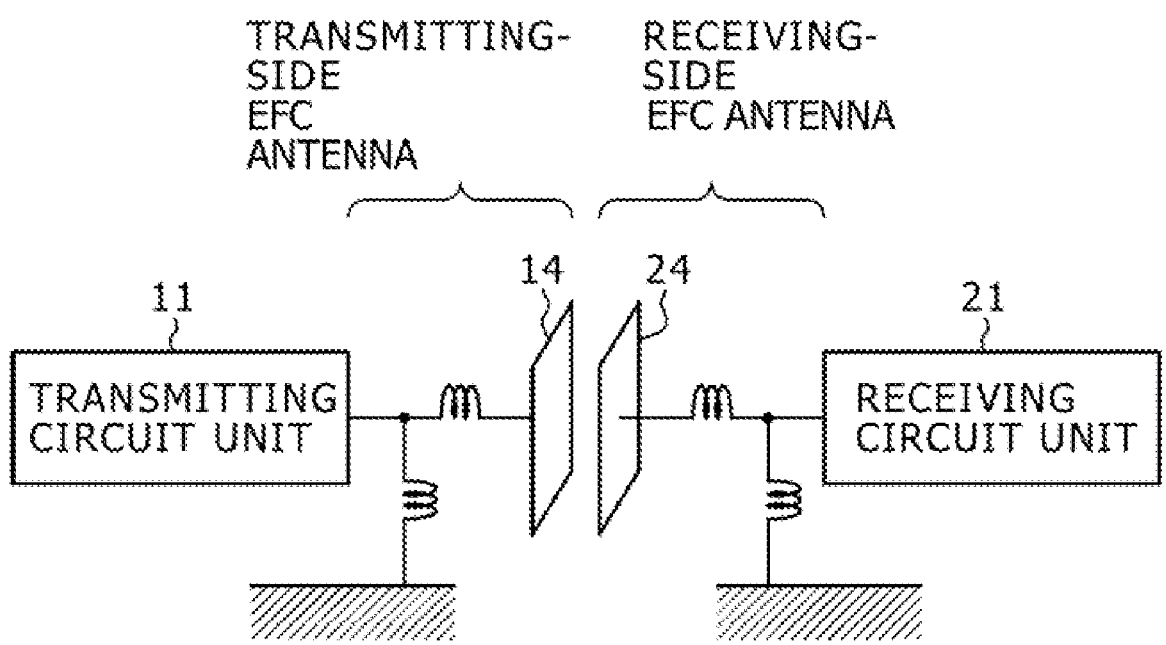
FIG. 16 shows one configuration of a communication system composed of a transmitter and a receiver each of which is equipped with an EFC antenna.

The basic configuration of the communication system composed of the transmitter and the receiver each of which is equipped with the EFC antenna is as shown in FIG. 16. For preferable formation of a transmission line by use of the capacitive coupling, essential requirements of the transmitter and the receiver as the EFC antennas are given as follows.

(1) Electrodes for coupling at the electric field are included.

(2) Resonance units for giving coupling by a stronger electric field are included.

(3) With respect to frequency bands available for communication, inductors and constants of capacitors by electrodes are included such that impedance matching is obtained when the EFC antennas are faced.

The impedance matching unit and/or the resonance unit (equivalent to a parallel inductor and a serial inductor) with respect to the EFC antenna may be made up of a lumped constant circuit or a distributed constant circuit.

Figure 1:
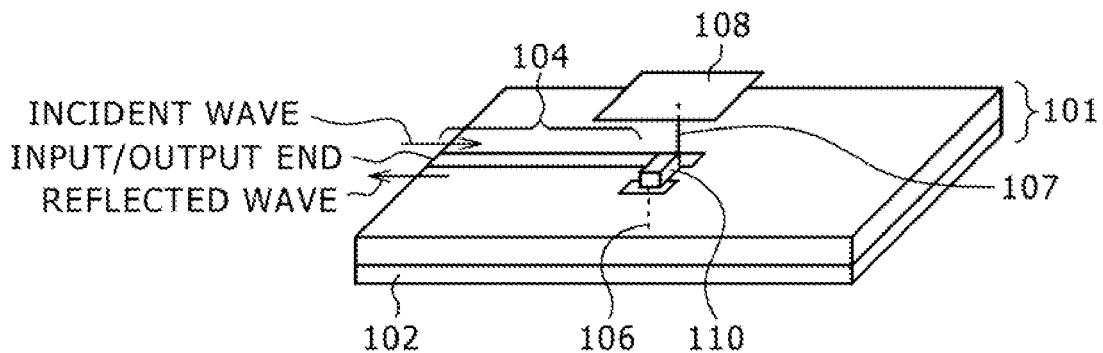
FIG. 1 is a view showing one circuit arrangement obtained by packaging of an EFC antenna having an impedance matching unit and/or a resonance unit in the form of a lumped constant circuit on a printed substrate.

FIG. 1 shows one circuit arrangement obtained by packaging of the EFC antenna having the impedance matching unit and/or the resonance unit in the form of the lumped constant circuit on a printed substrate. Referring to the arrangement shown, the EFC antenna is placed on a printed substrate 101 having a print pattern on an upper surface, with a ground conductor 102 formed on a lower surface. The EFC antenna has, at the end of a signal line pattern 104 on the printed substrate, a coupling electrode 108 placed through a metal line 107, and a parallel inductor 110 connected in parallel, and the other end of the parallel inductor 110 is connected to the ground conductor 102 via a through hole 106 in the printed substrate 101. The signal line pattern 104 forms a transmission line of waves incident onto the coupling electrode 108, as well as of waves (provided that the coupling electrode is conditioned to act as open-ended) reflected from the coupling electrode 108.

Figure 2A:
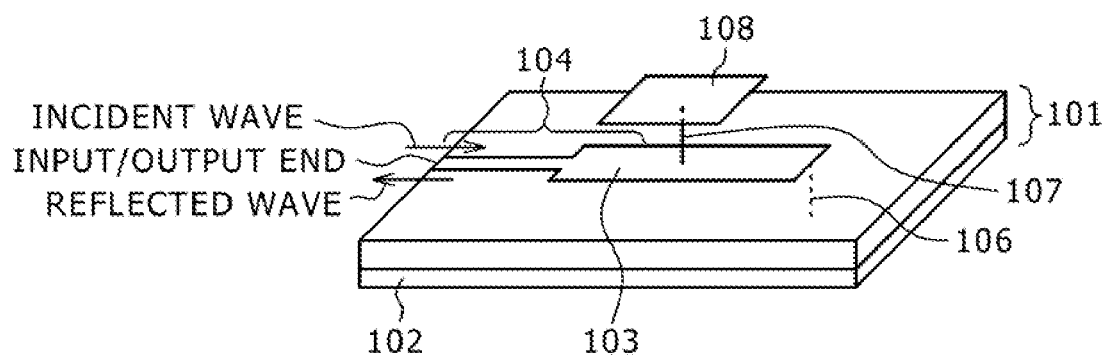
FIG. 2A is a view showing one circuit arrangement obtained by packaging of an EFC antenna having an impedance matching unit and/or a resonance unit in the form of a distributed constant circuit on the printed substrate.

FIG. 2A shows one circuit arrangement obtained by packaging of the EFC antenna having the impedance matching unit and/or the resonance unit in the form of the distributed constant circuit on the printed substrate. Referring to the arrangement shown, the EFC antenna is placed on the printed substrate 101 having the print pattern on the upper surface, with the ground conductor 102 formed on the lower surface. The EFC antenna has a conductor pattern, that is, a stub 103 serving as the distributed constant circuit, instead of the serial inductor and the parallel inductor serving as the lumped constant circuit, and is connected to a transmission/reception circuit module 105 through the signal line pattern 104. The end of the stub 103 is short-circuited and being connected to the lower surface ground conductor 102 via the through hole 106 passing through the printed substrate 101, and is also connected to the coupling electrode 108 through the metal line 107 in the vicinity of the center of the stub 103. The signal line pattern 104 forms the transmission line of the wave incident onto the coupling electrode, as well as of the waves (provided that the coupling electrode is conditioned to act as open-ended) reflected from the coupling electrode.

Figure 2B:
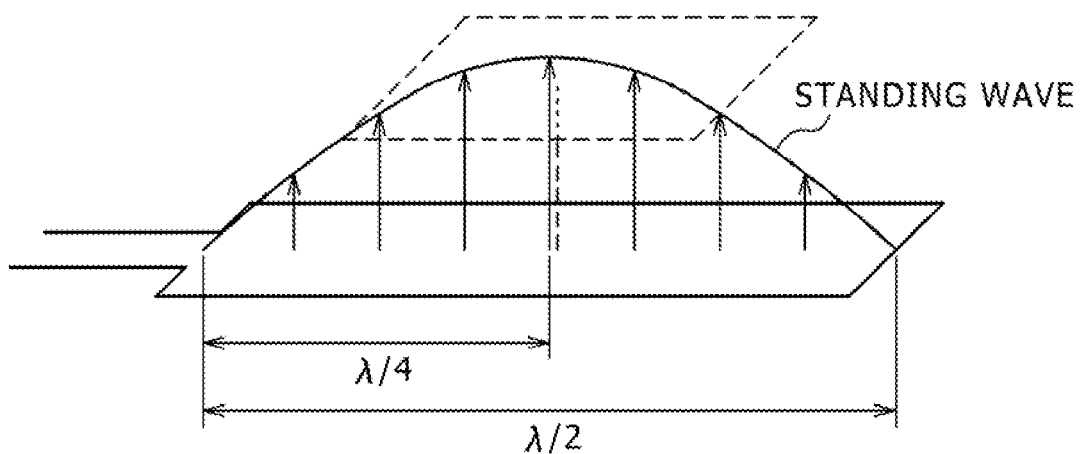
FIG. 2B is a graphic representation of a standing wave distribution on a stub of the EFC antenna shown in FIG. 2A.

The stub 103 is assumed to have a length equal to about one half wavelength of the RF signal, and the signal line 104 and the stub 103 are formed by lines on the printed substrate 101, such as micro-strip transmission lines and coplanar waveguides. When the end of the stub 103 having the length equivalent to one half wavelength is in a short-circuit condition, a voltage amplitude of standing wave produced within the stub 103 is of zero value at the stub end, and reaches its maximum in the stub center, specifically, at a point one fourth wavelength away from the end of the stub 103 (See FIG. 2B). Connection of the coupling electrode 108 through the metal line 107 to the stub 103—center where the voltage amplitude reaches its maximum allows fabrication of an EFC antenna having satisfactory propagation efficiency.

For the reason that the stub 103 included in the distributed constant circuit is sized as much as about one half wavelength of the RF signal, dimensional errors caused by transposition in the process of fabrication are extremely small in amount as compared with an overall length, and as a result, variations of characteristics hardly occur.

It is noted that the "stub" referred to in the technical field of Electronics is a general term of electric lines each having one end connected, while the other end is unconnected or grounded, and is provided midway in a circuit for uses such as adjustment, measurement, impedance matching and filtering.

For the RF circuit, it is generally known that the lumped constant circuit is narrower in bandwidth than the distributed constant circuit. When the impedance matching unit and the resonance unit are in the form of the lumped constant circuit as shown in FIG. 1, an operating frequency of the EFC antenna is determined by the constants of the parallel inductor and the serial inductor, causing actions to be effective only within the range of narrow band. In addition, when the frequency is high, the inductor constant decreases, resulting in a problem of creation of a difference in resonant frequency due to constant variations.

On the other hand, the EFC antenna may obtain uniform characteristics over a wide band by providing the impedance matching unit in the form of the stub 103 or the distributed constant circuit configured with the conductor pattern on the printed substrate 101 as shown in FIG. 2A. For this reason, applications of modulation systems which provide frequency spreading into wideband signals, such as DSSS (Direct Sequence Spread Spectrum) and OFDM (Orthogonal Frequency Division Multiplexing) modulation, are possible. The stub 103 is of the conductor pattern on the printed substrate 101, and causes a small loss even at the RF signal because of its small direct-current resistance, thereby allowing a reduction in propagation loss between EFC antennas.

However, unless otherwise specified, it is to be understood in the following description that both of the lumped constant circuit configuration shown in FIG. 1 and the distributed constant circuit configuration shown in FIG. 2A may be applied as the EFC antenna.

Capacitive coupling actions between EFC antennas are now described.

When the coupling electrodes of two EFC antennas are faced, the two EFC antennas makes propagation of the signals by means of the capacitive coupling between the coupling electrodes at frequencies adaptable to make communication. On the other hand, when the single EFC antenna is placed independently without having any coupling relation with the other EFC antennas, it is so designed that the RF signals having been inputted at the frequencies adaptable to make communication are turned back by reflection without being radiated outwards.

Proper length adjustment of a signal line connected to the EFC antenna (the signal line be integral multiple of one half wavelength, for instance) may provide matching of phases of the reflected wave and the incident wave in the absence of any coupling relation of the EFC antennas at an input/output end. At this time, when taking a view of the EFC antenna from the input/output end of the signal line, the input signals are observed as to be reflected in the approximately same amplitude and phase conditions. Thus, it may be considered that the EFC antenna becomes same condition of open end.

Figure 3:
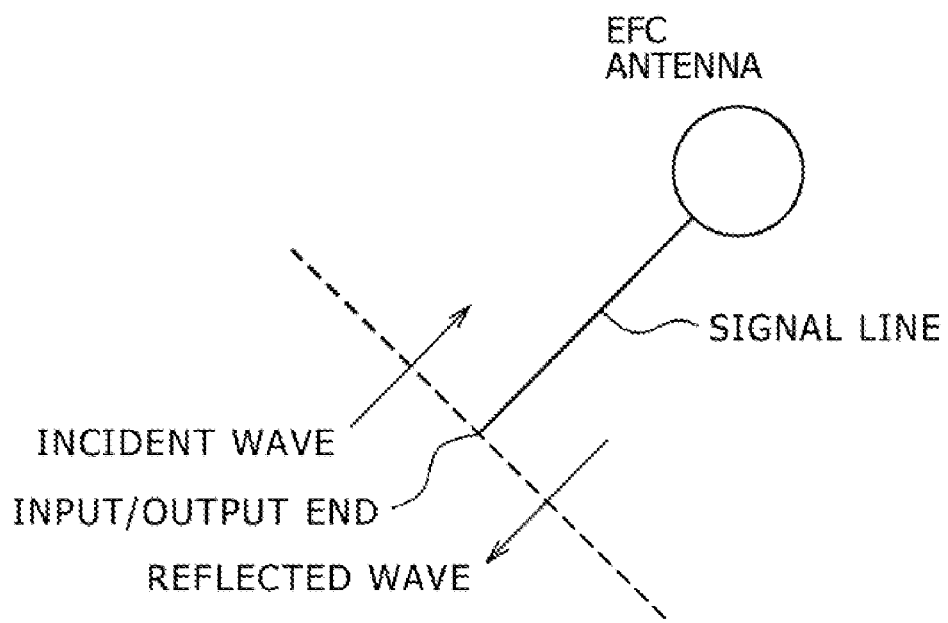
FIG. 3 schematically shows independent placement of the single EFC antenna.
Figure 4:
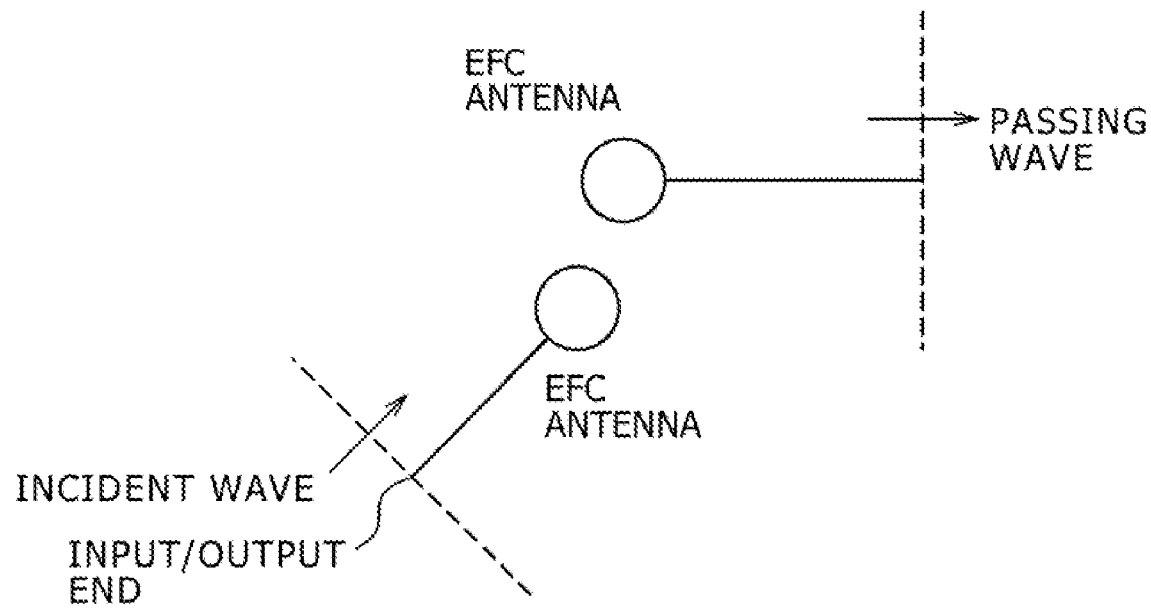
FIG. 4 schematically shows faced coupling electrodes of two EFC antennas.

FIG. 3 schematically shows independent placement of the single EFC antenna. FIG. 4 schematically shows two faced EFC antennas.

In the placement shown in FIG. 3, the EFC antenna is equivalent to open-ended, because the signal (the incident wave) having entered the EFC antenna having no coupling relation with the signal (the reflected wave) having been reflected by the EFC antenna are equal in amplitude and phase at the input/output end. Conversely, in the placement shown in FIG. 4, one EFC antenna has the coupling relation with the other EFC antenna, and hence, causes outward radiation of the input RF signal, such that a passing wave is observed at the other EFC antenna side without the presence of the reflected waves.

Hereupon, the communication system by use of the capacitive coupling needs to make subtle alignment between the coupling electrodes in order to produce the capacitive coupling by the coupling electrodes, and during data communication, the electrode position needs to be maintained. There are many details difficult for a user to understand in that at what portion of an apparatus the coupling electrode should be arranged, which electrode portion is required for contacting, or how angle of faced electrode should be determined to obtain an optimum communication situation. For this reason, there is a fear of failing to obtain the maximum communication speed.

It is conceivable as one solution to the problem of this type to arrange a plurality of EFC antennas in array form. For the radio communication, placement of a plurality of transmitting antenna in parallel causes transmitting power to be distributed to each antenna, and hence, brings about a reduction in individual antenna output, so the antennas making no contribution to the communication waste the transmitting power uselessly. On the other hand, with respect to the communication system based on the capacitive coupling, only the EFC antenna having the coupling relation with the other EFC antenna is adapted to transmit the RF signal and the EFC antennas other than the above act as open-ended. Specifically, even if the a plurality of EFC antennas are arranged in array, only the EFC antenna having the capacitive coupling with the other party for making communication act as a load, and the problem of the transmitting power waste by the EFC antenna having no capacitive coupling with the EFC antenna at the side of the other party of communication does not arise. By the way, when each individual EFC antenna comes to have the wider band as shown in FIG. 2, simultaneous use of a plurality of EFC antennas by placement of the EFC antennas in array may also provide effective actions while covering the wide band.

Figure 5:
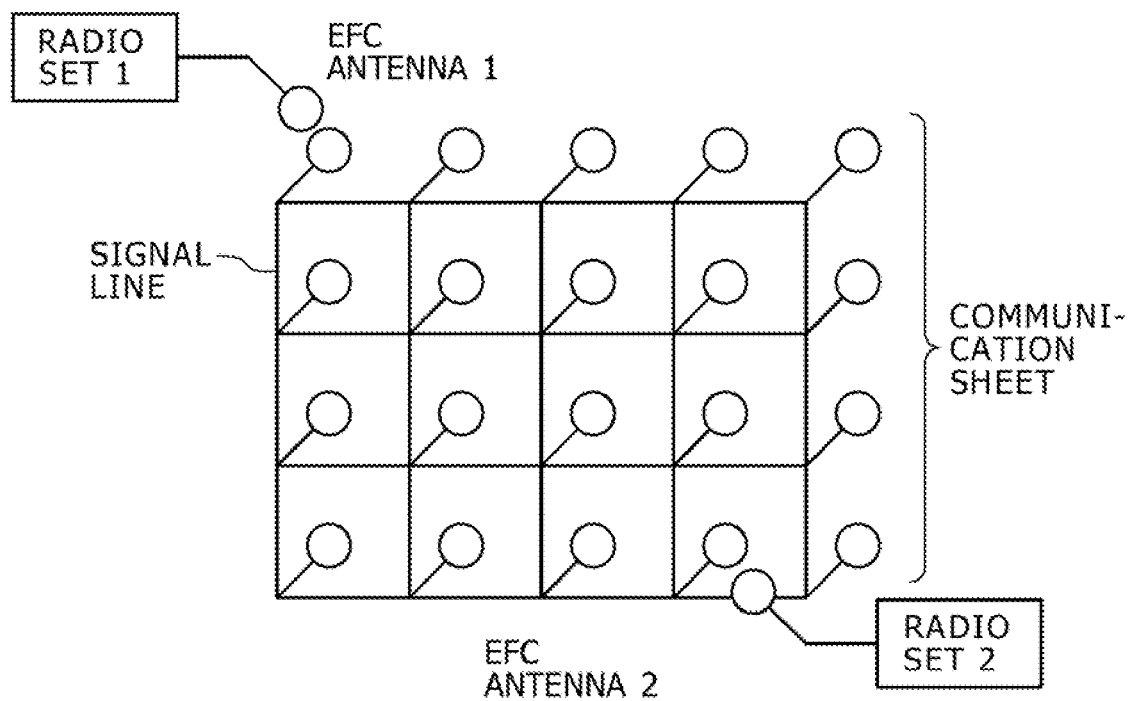
FIG. 5 schematically shows placement of a plurality of EFC antennas in array form.

FIG. 5 schematically shows placement of a plurality of EFC antennas in array. Referring to the placement shown, the EFC antenna is placed at each intersection point of a signal line laid in a lattice form. The signal line is made up of lines such as micro-strip transmission lines, coplanar waveguides and coaxial cables.

The placement shown permits a coupling apparatus composed of a group of EFC antennas of this type to be used as a communication apparatus called a "communication sheet" having the group of EFC antennas placed in array form on a sheet. The communication sheet shown is interposed between radio equipment 1 and 2, and makes propagation of, through the signal line, the RF signal having been received at the EFC antenna having the capacitive coupling with the EFC antenna of one radio equipment, followed by emission of the RF signal from the EFC antenna having the capacitive coupling with the EFC antenna of the other radio equipment.

On the communication sheet shown in FIG. 5, when the EFC antenna 1 of the radio equipment 1 and the EFC antenna 2 of the radio equipment 2 are brought closer to each other to have the coupling relation, those having no coupling relation with the radio equipment-side EFC antennas, among the EFC antennas on the communication sheet, may be substantially regarded as open-end with respect to the frequencies for making communication. Thus, as shown in FIG. 6, the communication sheet is assumed to be equivalent to a circuit including only the EFC antennas having the coupling relation with each other, with the EFC antennas other than the above cleared off.

The RF signal having been inputted from the EFC antenna of the radio equipment 1 is transmitted to the EFC antenna 2 through routes (1), (2) and (3) or other arbitrary routes within the communication sheet, and received by the radio equipment 2. Hereupon, when the spacing between intersection points of the signal line is set by amounts which are positive integral multiple of the wavelength, the EFC antenna 2 allows the signals inclusive of those having been transmitted within the communication sheet through any route to be observed in the same phase condition, thereby allowing the signals to be intensified by each other and perform efficient communication. Conversely, when the spacing between the intersection points of the signal line is not set by amounts which are positive integral multiple of the wavelength, there is no occurrence of match in phases of the signals having arrived to the same EFC antenna 2 through the different routes, thereby causing the signals to be enfeebled by each other under the action of interference.

Figure 6:
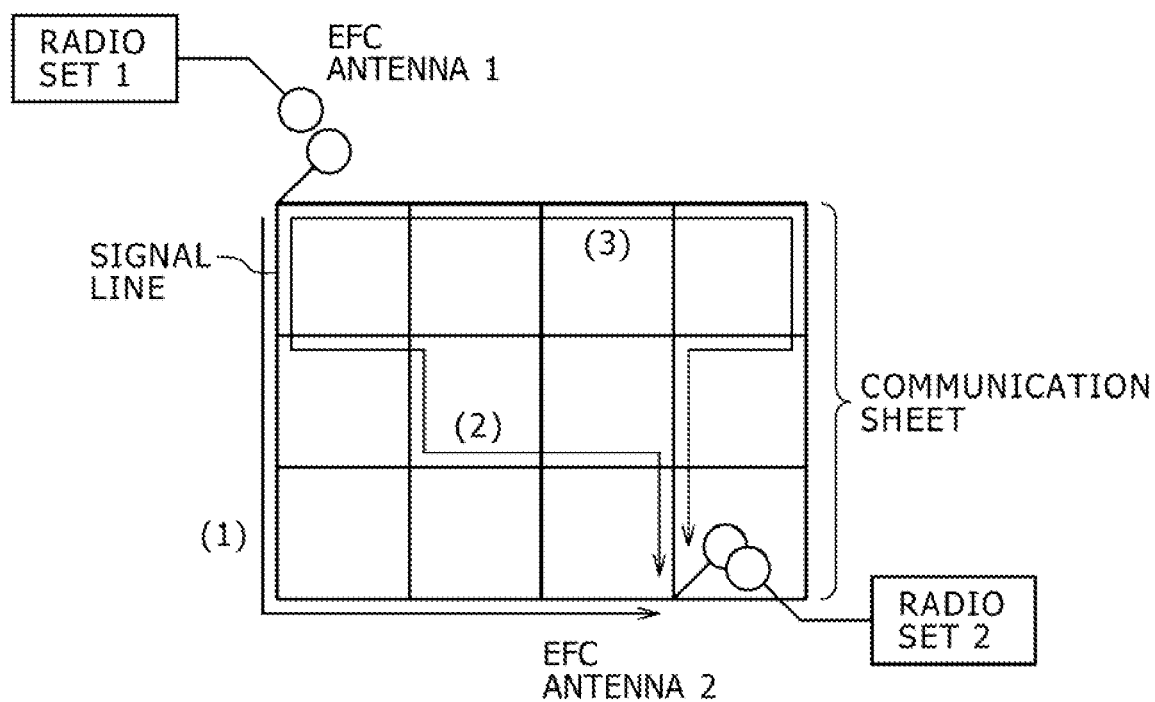
FIG. 6 schematically shows an equivalent circuit with respect to a communication sheet shown in FIG. 5 in a case where an EFC antenna of one radio equipment and an EFC antenna of another radio equipment are brought closer to each other to have capacitive coupling relation.

For the communication sheet whose signal line is latticed in a square form as shown in FIG. 5 or 6, the spacing between the intersection points is not necessary be positive integral multiple of the wavelength, and alternatively, may be positive integral multiple of one half wavelength in order to match the phases of the signals propagating from one arbitrary EFC antenna to the different arbitrary EFC antenna on the communication sheet. However, when the spacing between the intersection points of the signal line on the communication sheet is set at positive integral multiple of one half wavelength, the capacitive coupling with the other communication party-side EFC antenna among a plurality of mutually adjacent arbitrary EFC antennas results in output of the RF signals as signals of phases opposite to each other from the respective EFC antenna, causing the signals to be enfeebled by each other under the action of interference.

Figure 7:
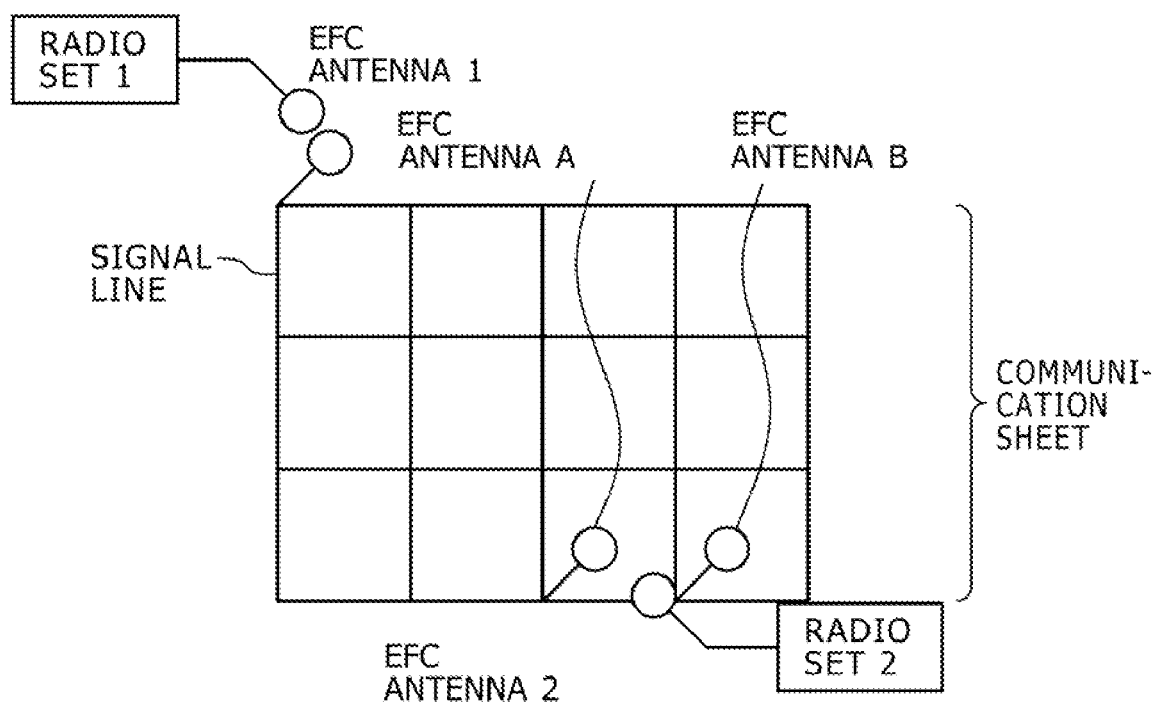
FIG. 7 shows, with respect to the communication sheet shown in FIG. 5, a state where a radio equipment-side EFC antenna is placed at a position equally distant from mutually adjacent EFC antennas.

For instance, coupling relation of the EFC antenna 2 of the radio equipment 2 is not limited to any one of the EFC antennas on the communication sheet as shown in FIG. 5. As shown in FIG. 7, the radio equipment 2—side EFC antenna 2 may be placed equally distant from a plurality of mutually adjacent EFC antennas, for example, the EFC antennas A and B to equally make coupling between the EFC antennas A and B. In that case, the RF signals received from the radio equipment 1 is transmitted through the signal line, and thereafter outputted respectively from the EFC antennas A and B. In this case, these output signals undergo mutual canceling each other because of mismatch in output signal phases, thus resulting in a failure to make communication between the radio equipment 1 and 2.

On the other hand, when the spacing between the intersection points of the signal line on the communication sheet is not set as positive integral multiple of one half wavelength, but positive integral multiple of the wavelength, equal coupling between the EFC antennas A and B under the condition that the radio equipment 2—side EFC antenna 2 is placed equally distant from the mutually adjacent EFC antennas A and B shown in FIG. 7 permits the output signals to be intensified by each other because of the match in output signal phases when the RF signals received from the radio equipment 1 are outputted from the EFC antennas A and B after being transmitted through the signal line. Thus, it is preferable that the spacing between the intersection points of the signal line on the communication sheet to be not positive integral multiple of one half wavelength but positive integral multiple of the wavelength.

While the communication sheet is configured by placement of the EFC antenna at each intersection point of the signal line laid in the lattice form, the lattice form is not limited to the square or the quadrangle as shown in FIGS. 5 to 7. For example, it is also allowable to provide the signal line latticed in a regular triangular form as shown in FIG. 8 for the configuration of the communication sheet by placement of the EFC antenna at each intersection point likewise.

Figure 8:
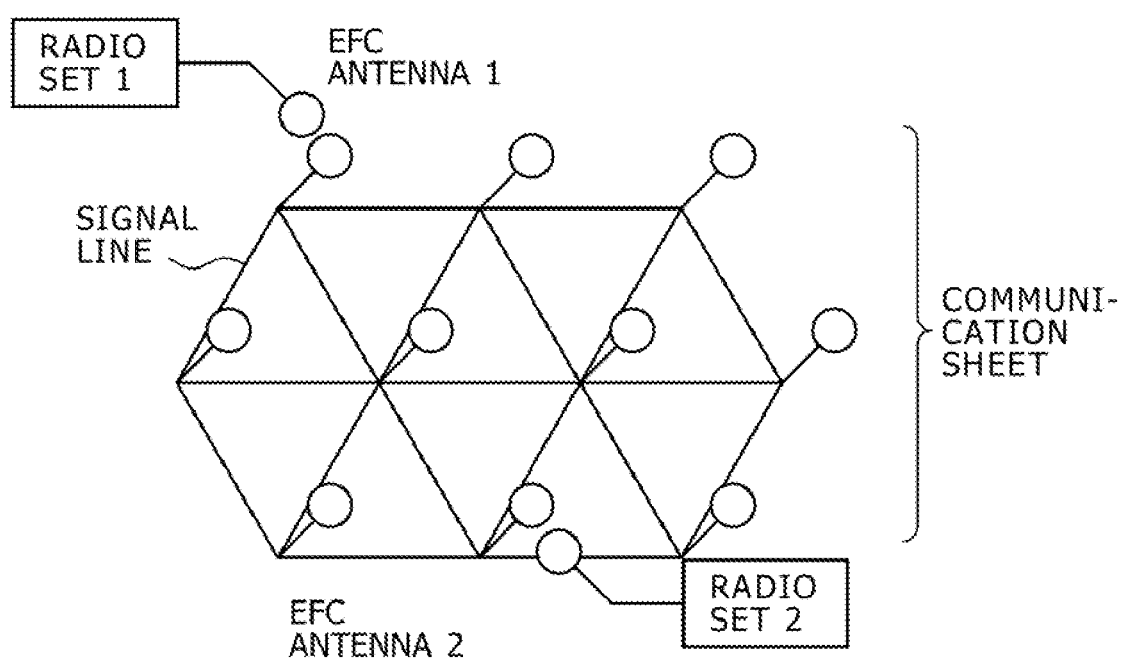
FIG. 8 schematically shows a configuration of the communication sheet obtained with a signal line latticed in a regular triangle form.

The communication sheet having the configuration as shown in FIG. 8 is also interposed between the radio equipment 1 and 2, and makes propagation of, through the signal line, the RF signal having been accepted with the EFC antenna having the capacitive coupling with the EFC antenna of one radio equipment, followed by emission of the RF signal from the EFC antenna having the capacitive coupling with the EFC antenna of the other radio equipment.

Figure 9:
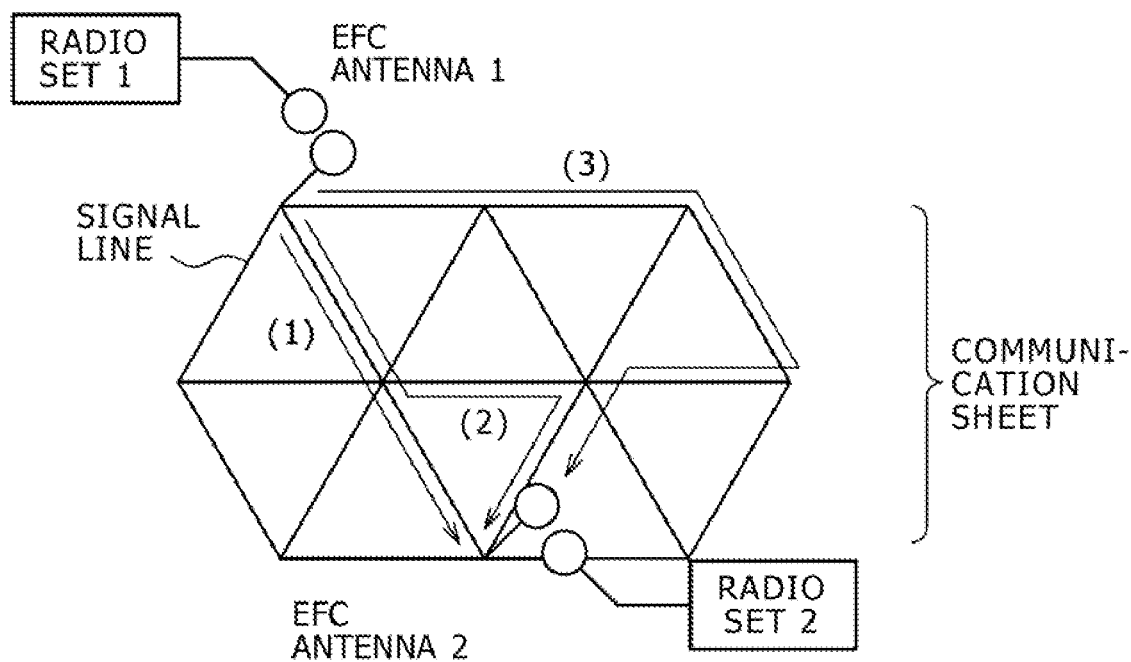
FIG. 9 schematically shows an equivalent circuit with respect to the communication sheet shown in FIG. 8 in a case where an EFC antenna of one radio equipment and an EFC antenna of another radio equipment are brought closer to each other to have capacitive coupling relation.

On the surface of the communication sheet as shown in FIG. 8, when the EFC antenna 1 of the radio equipment 1 and the EFC antenna 2 of the radio equipment 2 are brought closer to each other to give the coupling relation, those having no coupling relation with the radio equipment-side EFC antennas, among the EFC antennas on the communication sheet, may be regarded as substantially the same as open-ended with respect to the frequencies for making communication. Thus, as shown in FIG. 9, the communication sheet is supposed to be equivalent to a circuit including only the EFC antennas having the coupling relation with each other, with the EFC antennas other than the above cleared off.

The RF signal inputted from the EFC antenna of the radio equipment 1 is transmitted to the EFC antenna 2 through the routes (1), (2) and (3) or other arbitrary routes within the communication sheet, and received by the radio equipment 2. Hereupon, when the spacing between the intersection points of the signal line is set by amounts which are positive integral multiple of the wavelength, the EFC antenna 2 allows the signals inclusive of those having been transmitted through any route within the communication sheet to be observed in the same phase condition, enabling the signals to be intensified by each other to ensure efficient communication. Conversely, when the spacing between the intersection points of the signal line is not set by amounts which are positive integral multiple of the wavelength, there is no occurrence of match in phases of the signals having arrived at the same EFC antenna 2 through the different routes, causing the signals to be enfeebled by each other under the action of interference.

For the placement of the EFC antenna at each intersection point of the signal line laid in the lattice form, inclusive of the communication sheet configurations as shown in FIGS. 5 to 7 and 8, the efficient communication is attainable by setting the spacing between each intersection points to be positive integral multiple of the wavelength. Hereupon, when the available frequency band is assumed to be the UWB low band (previously described) in the range of 3.1 to 4.9 GHz, the wavelength of about 75 mm is obtained. Thus, use of the signal line taking a linear form fails to provide high density of the EFC antennas placed on the communication sheet. Specifically, when there is no sufficiently narrow spacing between the EFC antennas on the communication sheet, a lack of uniformity in a communication quality occurs at each position on the communication sheet, or a need arises to make, on the communication sheet, alignment of the radio equipment-side EFC antennas.

Figure 10:
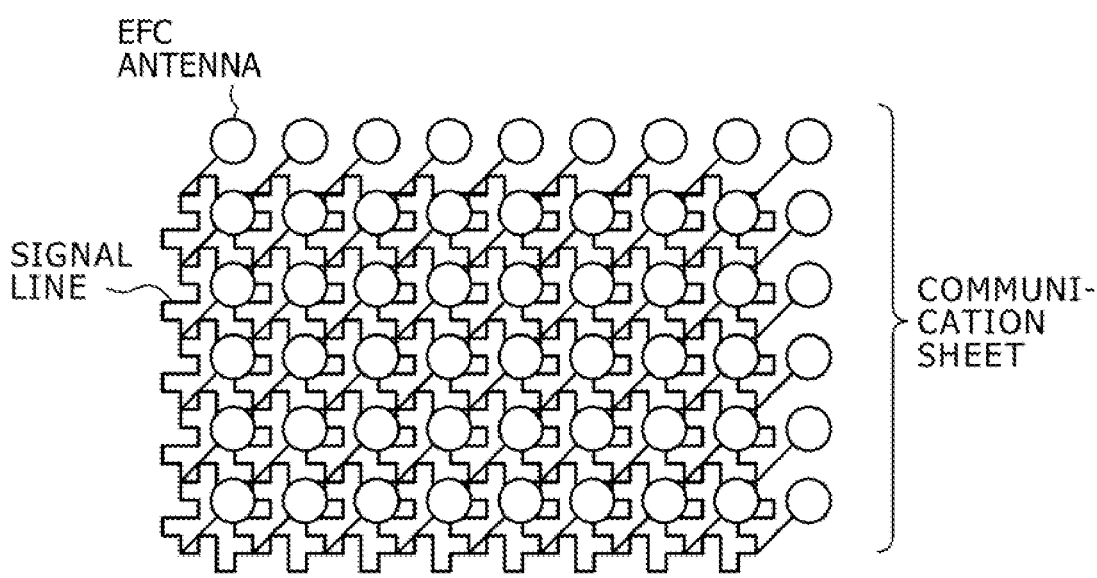
FIG. 10 schematically shows a configuration of a communication sheet formed by bending an intersection point-to-intersection point signal line.

Thus, it is also allowable to provide the intersection point-to-intersection point signal line in a bent form as shown in FIG. 10 in order to narrow the spacing between the EFC antennas on the communication sheet and realize more uniform communication over the communication sheet. However, in this case, the spacing between the intersection points of the signal line needs to be integral multiple of the wavelength of the signal for use in communication in order to match the phases of the signals having arrived at the same EFC antenna 2 through the different routes.

Figure 11:
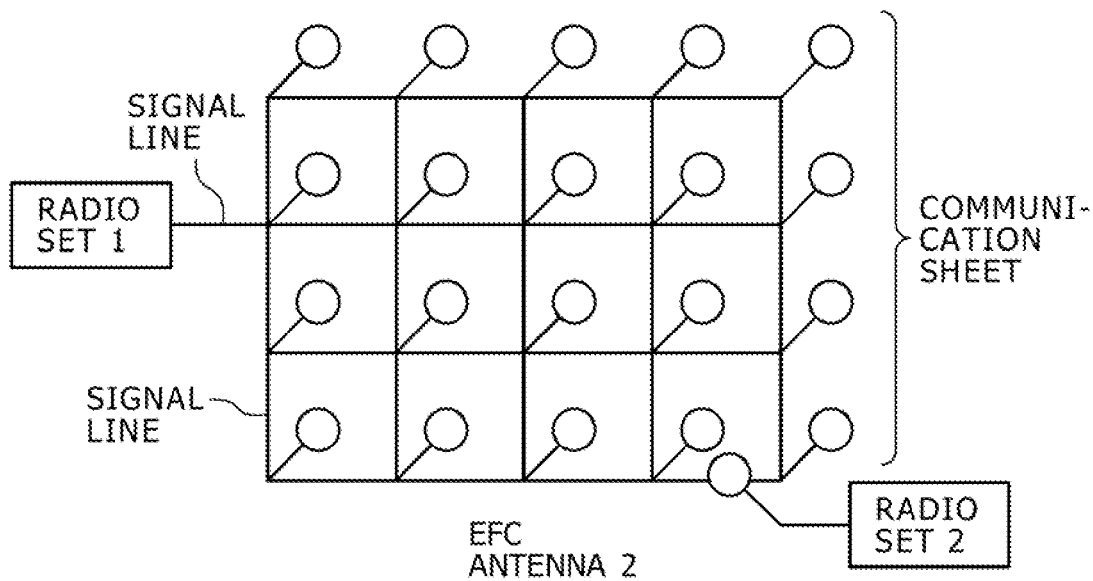
FIG. 11 shows one application of the communication sheet as an EFC antenna of the single radio equipment.

The coupling apparatus composed of the group of EFC antennas placed in array form may be applied as the EFC antenna of one radio equipment as shown in FIG. 11, instead of the signal transmission line interposed between the radio equipments as shown in FIG. 5. One application shown in FIG. 11 includes a different signal line adapted to connect between the radio equipment 1 and the intersection point of the signal line in the communication sheet to input/output the RF signal with respect to the communication sheet by cable.

Figure 12:
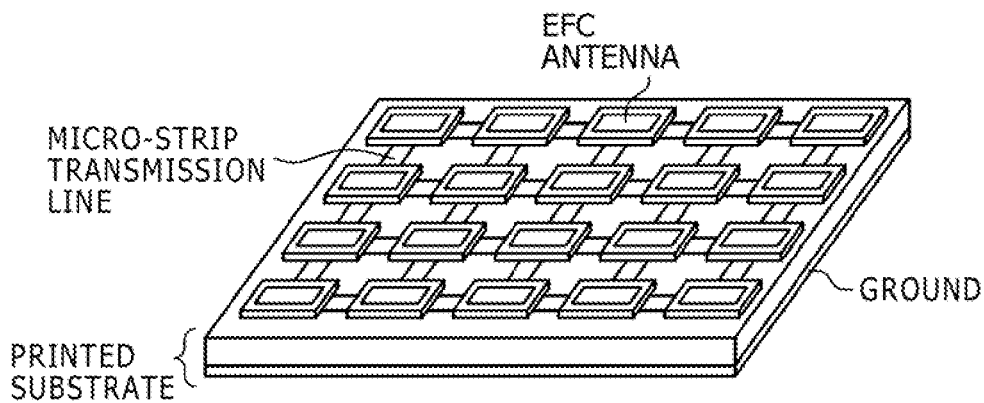
FIG. 12 shows a state where the signal line of the communication sheet is latticed with a micro-strip transmission line of a printed substrate, and the EFC antenna is connected to each intersection point.

One method of forming the communication sheet may be to connect the EFC antenna to each intersection point of the lattices of the communication sheet signal line made up of the micro-strip transmission line of the printed substrate as shown in FIG. 12. With the EFC antenna formed as a circuit component mounted on the substrate, connection of the EFC antenna for each lattice of the signal line through a process such as reflow soldering is possible.

Figure 13A:
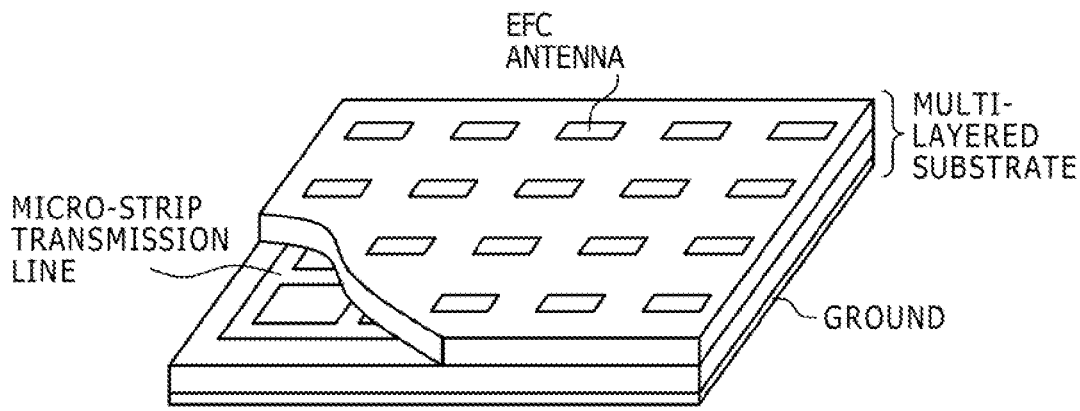
FIG. 13A shows a communication sheet in the form of a multi-layered substrate, inclusive of up to the EFC antenna.

Further, the communication sheet is not limited to those by use of the signal line, and may also take the form of a multi-layered substrate, inclusive of up to the EFC antenna as shown in FIG. 13A. In this case, the signal line is latticed on an inner layer of the multi-layered substrate.

Figure 13B:
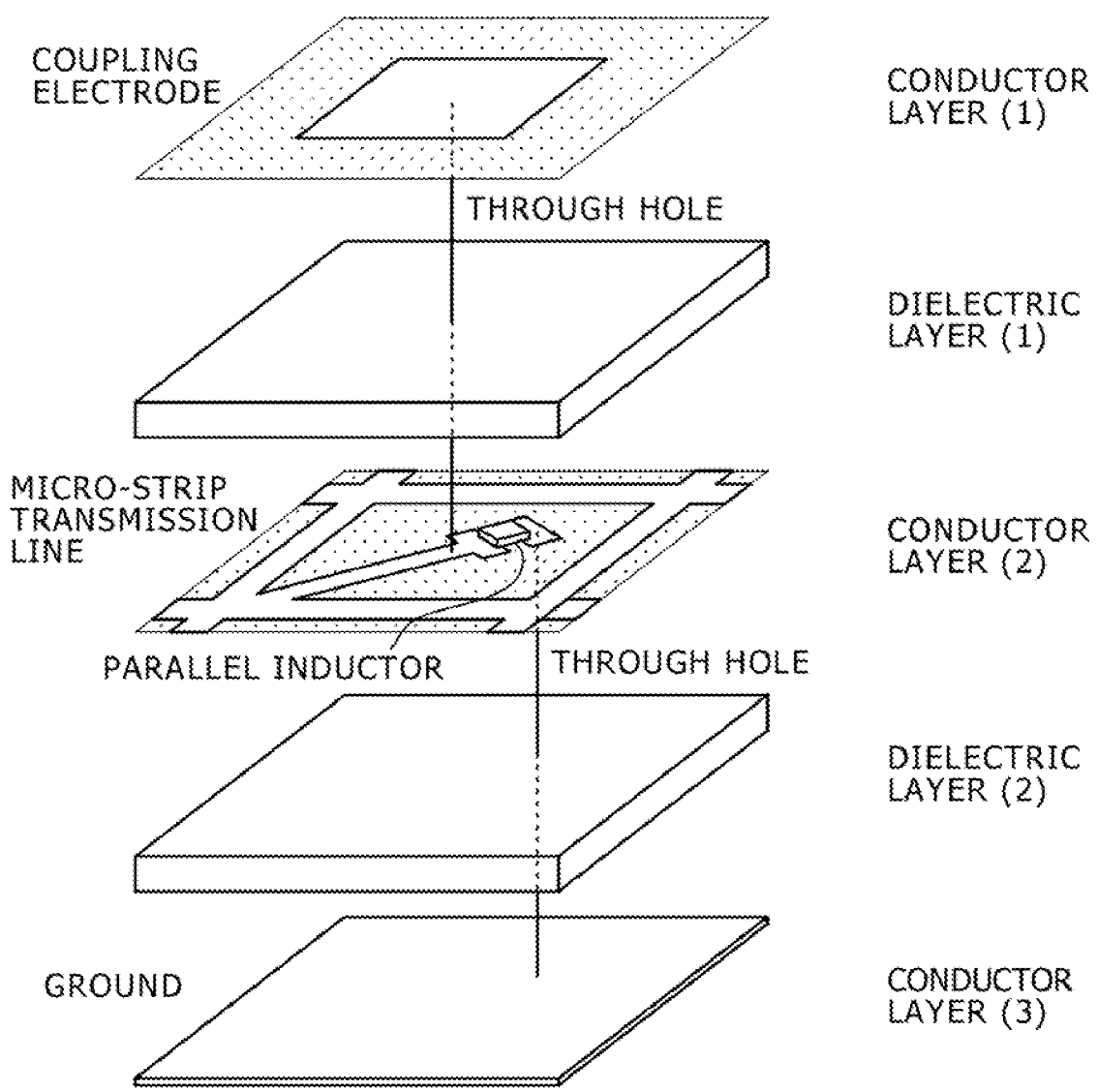
FIG. 13B shows an assembly structure of the communication sheet made up of the multi-layered substrate, inclusive of the EFC antenna in the form of the lumped constant circuit.

FIG. 13B shows an assembly structure of the communication sheet made up of the multi-layered substrate, inclusive of the EFC antenna in the form of the lumped constant circuit.

The communication sheet shown is obtained by lamination of three conductor layers, respectively through dielectric layers, such as a conductor layer serving as the coupling electrode, a conductor layer having, in the laid arrangement, the signal line made up of the micro-strip transmission line and a conductor layer serving as the ground. At the conductor layer included in the signal line, the parallel inductor is connected at each intersection point of the signal line, and each end of the parallel inductor is connected to each of the coupling electrode and the ground via the through holes passing through the dielectric layers.

By setting the length of signal line for connection between the intersection point of the signal line and the parallel inductor to integral multiple of one half wavelength, it is possible to match the phases of the reflected wave and the incident wave at the input/output end, when the coupling electrode acts as open-ended.

Use of the dielectric layers made up of a material having a high dielectric constant allows narrower spacing between the intersection points of the signal line by wavelength shortening effects.

Figure 13C:
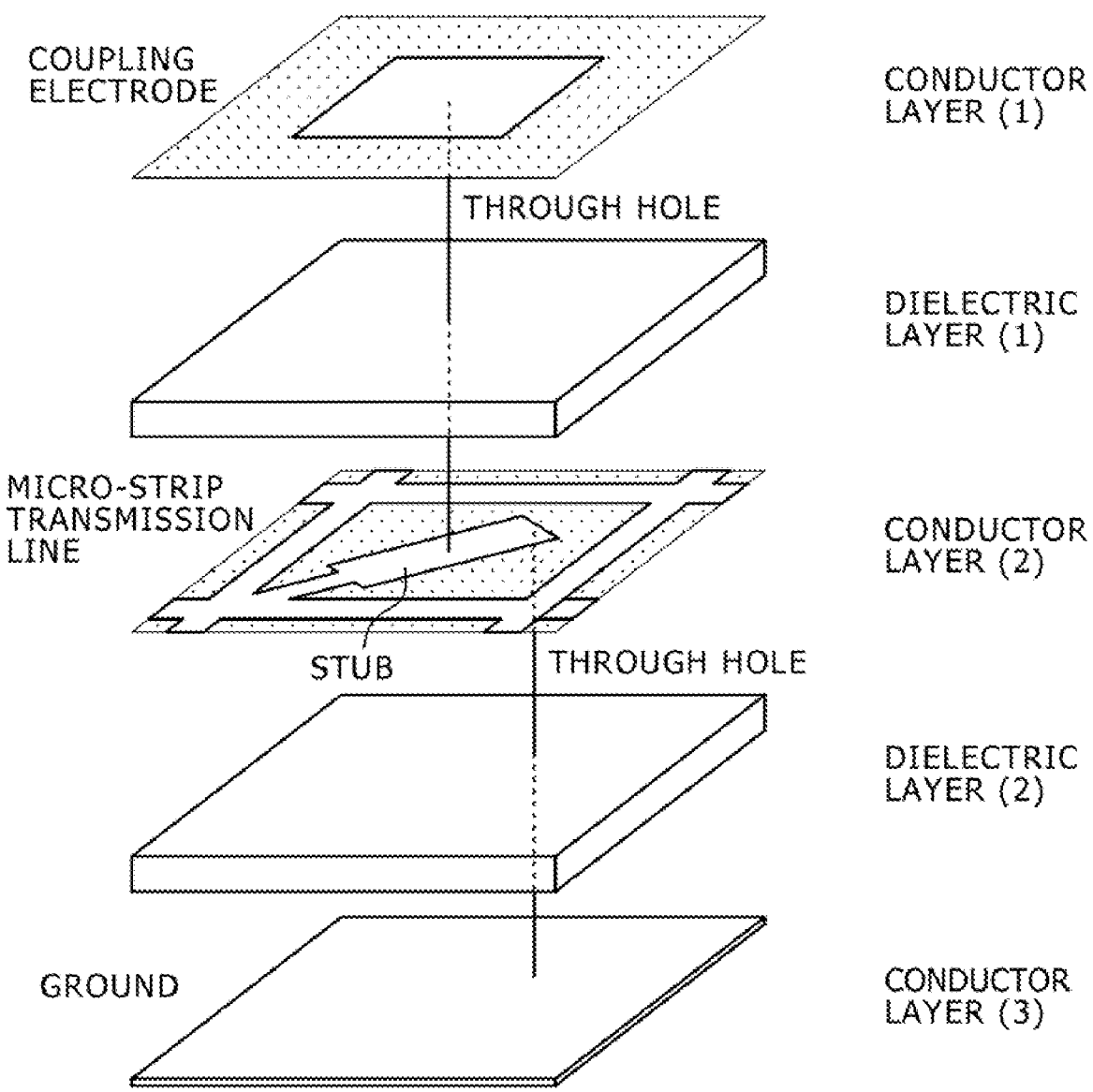
FIG. 13C shows an assembly structure of the communication sheet made up of the multi-layered substrate, inclusive of the EFC antenna in the form of the distributed constant circuit.

FIG. 13C shows an assembly structure of the communication sheet made up of the multi-layered substrate, inclusive of the EFC antenna in the form of the distributed constant circuit.

The communication sheet shown is obtained by lamination of three conductor layers, respectively through dielectric layers, such as a conductor layer serving as the coupling electrode, a conductor layer having, in the laid arrangement, the signal line made up of the micro-strip transmission line and a conductor layer serving as the ground. At the conductor layer included in the signal line, the stub is connected at each intersection point of the signal line. The length of stub is as long as about one half wavelength of the RF signal, and is connected, at its end, to the ground via the through hole passing through the dielectric layer, while being connected, via the through hole passing through the dielectric layer, to the coupling electrode at the point one fourth wavelength distance from the end, where the voltage amplitude of the standing wave reaches its maximum.

By setting the length of signal line for making connection between the intersection point of the signal line and the stub to integral multiple of one half wavelength, it is possible to match the phases of the incident wave and the reflected wave at the input/output end when the coupling electrode acts as open-ended.

Use of the dielectric layers made up of a material having a high dielectric constant may allow narrow spacing between intersection points of the signal line by wavelength shortening effects.

Figure 14:
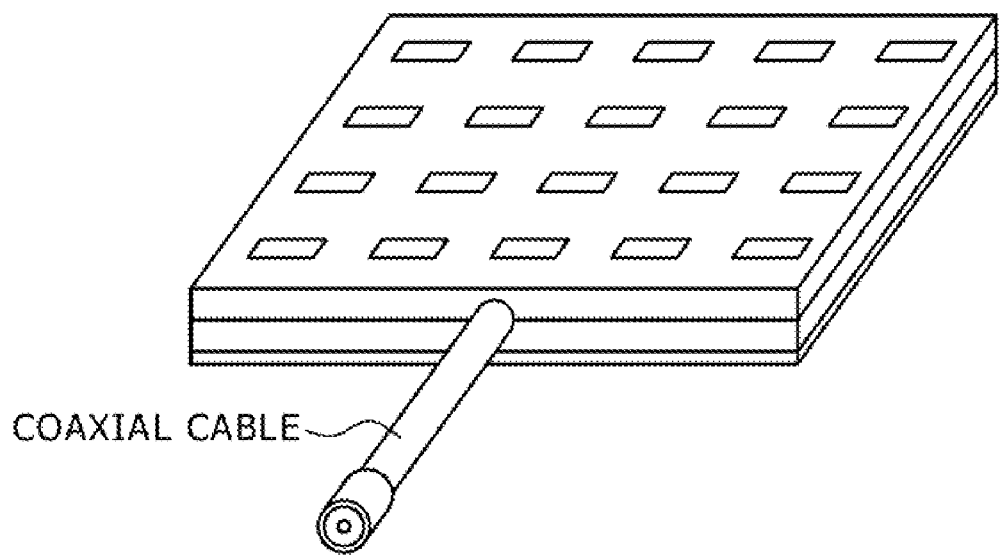
FIG. 14 shows one configuration obtained by connection of a coaxial cable to an intersection point of the signal line included in an inner layer of the communication sheet in the form of the multi-layered substrate shown in FIG. 13.

Alternatively, as shown in FIG. 14, it is also allowable to connect a coaxial cable to the intersection point of the signal line included in the inner layer of the communication sheet in the form of the multi-layered substrate as shown in FIG. 13 to perform input/output of the RF signal to the communication sheet directly by cable without passing through the EFC antenna.

Figure 15:
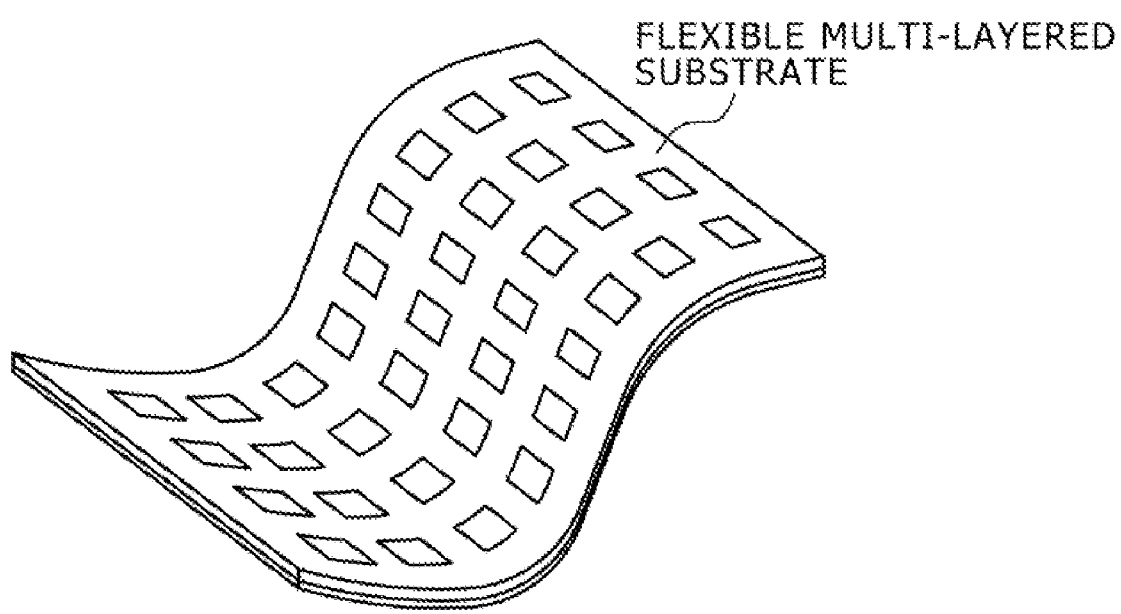
FIG. 15 shows the communication sheet obtained by using a flexible material as the multi-layered substrate.

Alternatively, as shown in FIG. 15, use of a flexible material for the multi-layered substrate is adaptable to fabricate a communication sheet successful in giving a two-dimensional communication function to something like a tablecloth.

Placement of the EFC antenna-mounted radio equipment in an arbitrary location on the communication sheet as shown in FIGS. 12 to 15 may facilitate more privacy-securable communication efficiently through the communication sheet without having any effect on the external apparatus. Further, it is also possible to transmit, in a non-contact manner, the power to the electric apparatus placed in the arbitrary location on the communication sheet by taking out the power after rectification of the RF signal received at the EFC antenna.

In the foregoing, the present invention has been described in detail with reference to the specific embodiments. However, it is to be understood that modifications and substitutions of the above embodiments will be allowable to those skilled in the art, without departing from the scope of the present invention.

While the present specification described with emphasis on the embodiments applied to the communication system adapted to perform cable-less data transmission of the UWB signals by use of the capacitive coupling, the scope of the present invention is not limited to the above. Applications of the present invention to RF signal communication systems other than the UWB communication system, as well as to communication systems adapted to perform data transmission based on the capacitive coupling by using relatively low frequency signals are also possible.

To sum up, the present invention has been disclosed as illustrative, and all matters contained in the present specification shall be interpreted not in a limiting sense. The scope of the present invention is to be determined in consideration of the appended claims.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2006-314459 filed in the Japanese Patent Office on Nov. 21, 2006, the entire content of which being incorporated herein by reference.

What is claimed is:

1. A communication system, comprising:
   a transmitter having a transmitting circuit unit to generate a RF signal for data transmission and an electric-field-coupling antenna to send out the RF signal as an induction field and/or an electrostatic field;
   a receiver having an electric-field-coupling antenna and a receiving circuit unit to receive and process a RF signal received by the electric-field-coupling antenna; and
   a coupling apparatus having at least one transmitter-side electric-field-coupling antenna to receive the RF signal which is in capacitive coupling with the transmitter-side electric-field-coupling antenna and outputted from the electric-field-coupling antenna, a signal line to transmit the received RF signal, and at least one receiver-side electric-field-coupling antenna to output the RF signal which is in capacitive coupling with the receiver-side electric-field-coupling antenna and transmitted through the signal line.

2. The communication system according to claim 1, wherein:
   the RF signal is a UWB signal covering an ultra wide band range.

3. The communication system according to claim 1, wherein:
   In the coupling apparatus, the signal line is laid in a lattice form, and a plurality of transmitter-side electric-field-coupling antennas and the receiver-side electric-field-coupling antennas are respectively placed on an intersection point of the signal lines.

4. The communication system according to claim 3, wherein:
   among a plurality of electric-field-coupling antennas contained in the coupling apparatus, only those having capacitive coupling with the transmitter-side electric-field-coupling antenna or the receiver-side electric-field-coupling antenna act as a load, while the electric-field-coupling antennas other than the above act as open-end.

5. The communication system according to claim 3, wherein:
   spacing between the intersection points of the signal lines is positive integral multiple of a wavelength.

6. The communication system according to claim 5, wherein:
   spacing between the electric-field-coupling antennas is shortened by bending portions of the signal line, which connect the intersection points.

7. The communication system according to claim 1, wherein:
   the coupling apparatus includes a printed substrate, a signal line containing a micro-strip transmission line on the printed substrate, and an electric-field-coupling antenna connected to each intersection point of the signal line.

8. The communication system according to claim 1, wherein:
   the coupling apparatus is formed of a multi-layered substrate, the multi-layered substrate including a first conductor layer serving as a coupling electrode, a second conductor layer having, in a laid arrangement, a signal line containing a micro-strip transmission line, a third conductor layer serving as a ground, and dielectric layers disposed between the conductor layers, wherein;
   in the second conductor layer, a resonance unit in the form of a lumped constant circuit or a distributed constant circuit is connected to each intersection point of the signal line, and the resonance unit is connected to the coupling electrode and the ground via through holes passing through each of the dielectric layers.

9. The communication system according to claim 8, wherein:
   a coaxial cable is connected to the intersection point of the signal line included in an inner layer of the multi-layered substrate to perform input/output of the RF signal by cable without passing through the electric-field-coupling antenna.

10. The communication system according to claim 8, wherein:
    the multi-layered substrate is formed of a flexible material.

11. A communication apparatus, comprising:
    a signal line laid in a lattice form; and
    a plurality of electric-field-coupling antennas placed at each intersection point of the signal line;
    wherein each electric-field-coupling antenna has a coupling electrode and a resonance unit in the form of a lumped constant circuit or a distributed constant circuit to intensify electric coupling between the coupling electrodes each other.

12. The communication apparatus according to claim 11, wherein:
    the RF signal is a UWB signal for use in an ultra wide band.

13. The communication apparatus according to claim 11, wherein:
    among the a plurality of electric-field-coupling antennas, only those having capacitive coupling with the electric-field-coupling antenna included in a radio equipment for making communication, operate as a load, while the electric-field-coupling antennas other than the above operate as open-end.

14. The communication apparatus according to claim 11, wherein:
    spacing between the intersection points of the signal lines is positive integral multiple of a wavelength.

15. The communication apparatus according to claim 14, wherein:
    narrow spacing between the electric-field-coupling antennas is provided by bending the signal lines connecting the intersection points.

16. The communication apparatus according to claim 11, comprising:
    a printed substrate;
    a signal line made up of a micro-strip transmission line on the printed substrate; and
    a electric-field-coupling antenna connected to each intersection point of the signal line.

17. The communication apparatus according to claim 11, wherein:
    a multi-layered substrates, such as a first conductor layer serving as a coupling electrode, a second conductor layer having, in a laid arrangement, a signal line made up of a micro-strip transmission line, and a third conductor layer serving as a ground are laminated respectively through dielectric layers, and in the second conductor layer, a resonance unit in the form of a lumped constant circuit or a distributed constant circuit is connected to each intersection point of the signal line, thereby allowing the resonance unit to be connected to each of the coupling electrode and the ground via through holes passing through each of the dielectric layers.

18. The communication apparatus according to claim 17, wherein:

a coaxial cable is connected to the intersection point of the signal line included in an inner layer of the multi-layered substrate to perform input/output of the RF signal by cable without passing through the electric-field-coupling antenna.

19. The communication apparatus according to claim 17, wherein:

the multi-layered substrate is formed with a flexible material.

* * * * *